United States Patent [19]

Blades

[11] Patent Number: 5,452,413
[45] Date of Patent: * Sep. 19, 1995

[54] METHOD AND SYSTEM FOR MANIPULATING WIDE-ANGLE IMAGES

[75] Inventor: Jerry A. Blades, Rochester, Minn.

[73] Assignee: International Business Machines Corporation, Armonk, N.Y.

[*] Notice: The portion of the term of this patent subsequent to Feb. 21, 2012 has been disclaimed.

[21] Appl. No.: 993,182

[22] Filed: Dec. 18, 1992

[51] Int. Cl.⁶ .................................... G06F 17/00
[52] U.S. Cl. .................................... 395/159
[58] Field of Search ............ 395/155, 156, 157, 158, 395/159, 160, 161; 345/121, 123, 125

[56] References Cited

U.S. PATENT DOCUMENTS

| | | | |
|---|---|---|---|
| 4,786,897 | 11/1988 | Takanashi et al. | 340/721 |
| 4,831,556 | 5/1989 | Oono | 364/521 |
| 4,862,390 | 8/1989 | Weiner | 364/521 |
| 4,896,291 | 1/1990 | Gest et al. | 364/900 |
| 4,939,507 | 7/1990 | Beard et al. | 340/706 |
| 4,942,540 | 7/1990 | Black et al. | 364/514 |
| 4,962,473 | 10/1990 | Crain | 364/900 |
| 4,989,610 | 2/1991 | Patton et al. | 128/695 |
| 4,999,790 | 3/1991 | Murayama et al. | 364/521 |
| 5,014,222 | 5/1991 | Donahue | 364/521 |
| 5,019,809 | 5/1991 | Chen | 340/815.31 |
| 5,027,400 | 6/1991 | Baji et al. | 380/20 |
| 5,073,771 | 12/1991 | Satta et al. | 340/721 |
| 5,146,557 | 9/1992 | Yamrom et al. | 395/161 |
| 5,148,154 | 9/1992 | MacKay et al. | 340/712 |

FOREIGN PATENT DOCUMENTS

| | | | |
|---|---|---|---|
| 0456593A2 | 11/1991 | European Pat. Off. | G06F 3/033 |
| 0498082 | 12/1992 | European Pat. Off. | |
| 63-24420 | 2/1988 | Japan | G06F 3/14 |
| 02-37394 | 2/1990 | Japan | G06F 3/14 |
| 03-30011 | 2/1991 | Japan | G06F 3/14 |

OTHER PUBLICATIONS

Crane, "Word for Windows Companion", The Cobb Group, Inc. (1990), pp. 11–23.
IBM Technical Disclosure Bulletin, vol. 36, No. 7, Jul. 1993 "Executive Scrolling Device", pp. 461–462.

Primary Examiner—Mark K. Zimmerman
Assistant Examiner—N. Kenneth Burraston
Attorney, Agent, or Firm—J. Michael Anglin; Duke W. Yee; Andrew J. Dillon

[57] ABSTRACT

A method and system in a data processing system having a display device for efficiently managing the display of an image. The image includes a number of segments, wherein only a portion of the segments may be simultaneously displayed within the display device at a selected resolution. The method and system of the present invention provides a substantially circular control icon having a defined periphery. One or more of the segments within the image may be associated with selected points along the defined periphery. A rotatable pointer element rotatable about a point within the substantially circular control icon is also provided. The portion of the segments displayed within the display device is selectively altered in response to a rotation of the rotatable pointer element. The display of the image also may be altered in response to movement of a slider or some other control element within the rotatable pointer element.

12 Claims, 5 Drawing Sheets

METHOD AND SYSTEM FOR MANIPULATING WIDE-ANGLE IMAGES

CROSS REFERENCE TO RELATED APPLICATION

The invention disclosed in this application is related to an application for U.S. patent application Ser. No. 07/992,891 filed concurrently herewith and entitled "METHOD AND SYSTEM FOR MANIPULATING DATA THROUGH A GRAPHIC USER INTERFACE WITHIN A DATA PROCESSING SYSTEM".

Applicant incorporates said application Ser. No. 07/992,891 by reference herein.

BACKGROUND OF THE INVENTION

1. Technical Field

The present invention relates in general to improved data processing systems and in particular, to improvements in manipulating data through a graphic user interface within a data processing system. Still more particularly, the present invention relates to improvements in a graphic user interface for manipulating the display of wide-angle images displayed in a data processing system.

2. Description of the Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of a modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

The term "mouse", when utilized in this document, refers to any type of operating system supported graphical pointing device including, but not limited to: a mouse, track ball, light pen, touch screen, and, the like. A pointing device is typically employed by a user of a data processing system to interact with the data processing system's GUI. A "pointer" is an iconic image controlled by a mouse or other such devices, and is displayed on the video display device of a data processing system to visually indicate to the user icons, menus, or the like that may be selected or manipulated.

A "scroll bar" is a known user interface component that is associated with a scrollable area of a display, indicating to a user that more information is available and may be added in a particular direction with respect to the display. A scroll bar may be utilized to scroll additional data into view and a scroll bar typically includes a slider and scroll buttons.

Graphic images may, for example, consist of "wide-angle" or panoramic images. A wide-angle or panoramic image, hereinafter referred to as "wide-angle image", may be, for example, digitized photographs, videos or a computer generated image. Wide-angle images may be presented to a user in a multimedia presentation. When viewing this material on a multimedia data processing system, the screen or viewing window on the display device or video display terminal may not be capable of displaying the entire image at one time without distorting the image or reducing the clarity of the image. Presently available GUIs do not provide quick and easy manipulation of such wide-angle images.

Therefore, it is would be desirable to have method and system for displaying and manipulating portions of a wide-angle image within a data processing system.

SUMMARY OF THE INVENTION

It is therefore one object of the present invention to provide an improved method and system for manipulating data through a graphic user interface within a data processing system.

It is another object of the present invention to provide an improved method and system in a graphic user interface for viewing a wide-angle images displayed in a data processing system.

It is yet another object of the present invention to provide an improved method and system for manipulating wide-angle images in a data processing system.

The foregoing objects are achieved as is now described. The present invention provides a method and system in a data processing system having a display device for efficiently managing the display of an image. The image includes a number of segments, wherein only a portion of the segments may be simultaneously displayed within the display device at a selected resolution. The method and system of the present invention provides a substantially circular control icon having a defined periphery. One or more of the segments within the image may be associated with selected points along the defined periphery. A rotatable pointer element, rotatable about a point within the substantially circular control icon, is also provided. The portion of the segments displayed within the display device is selectively altered in response to a rotation of the rotatable pointer element. The display of the image also may be altered in response to movement of a slider or some other control element within the rotatable pointer element.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
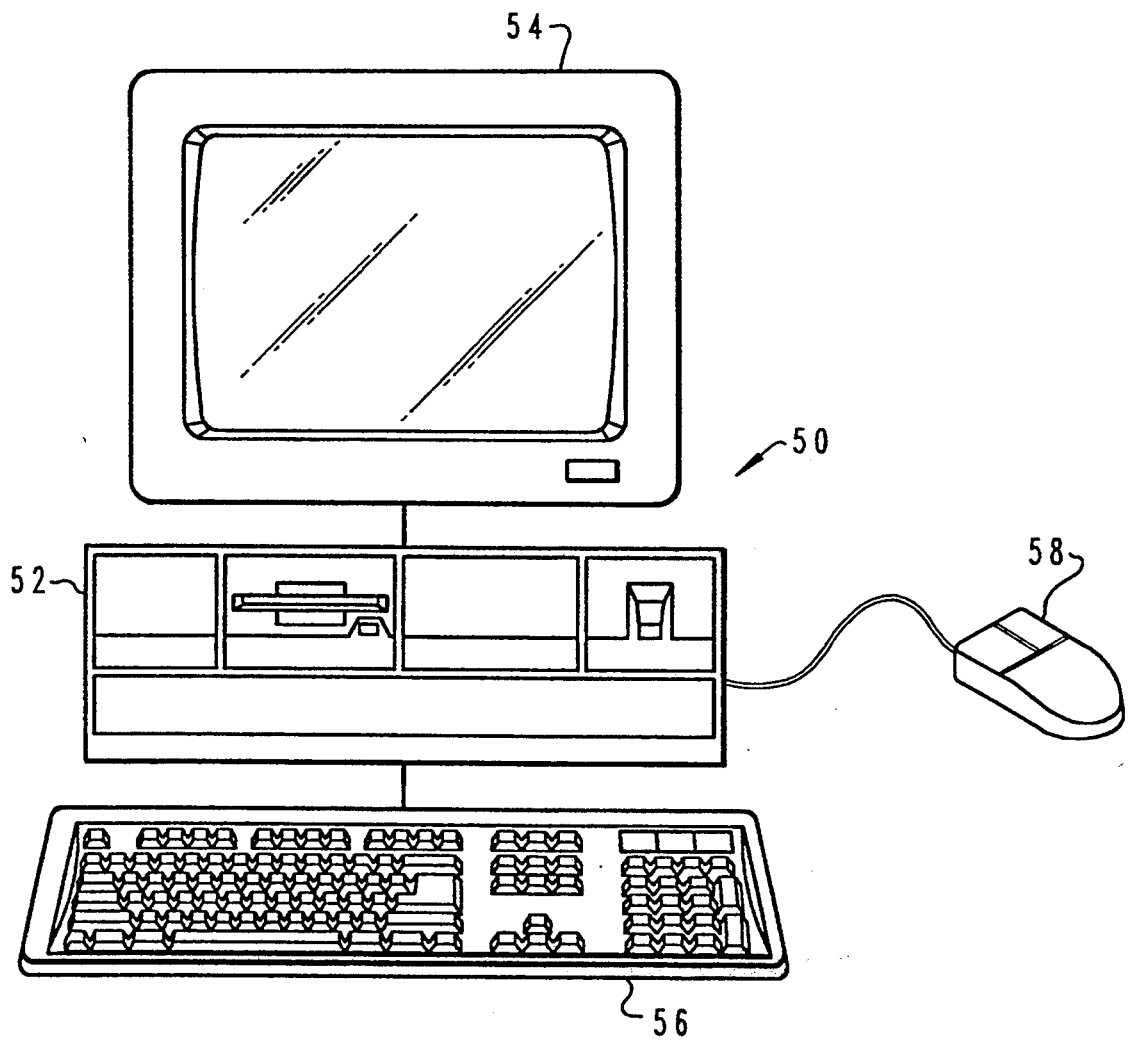
FIG. 1 is a pictorial representation of a personal computer that may be utilized to implement a method and system of the present invention.

With reference now to the figures and in particular with reference to FIG. 1, there is depicted a pictorial representation of a computer system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or minicomputers.

Figure 2:
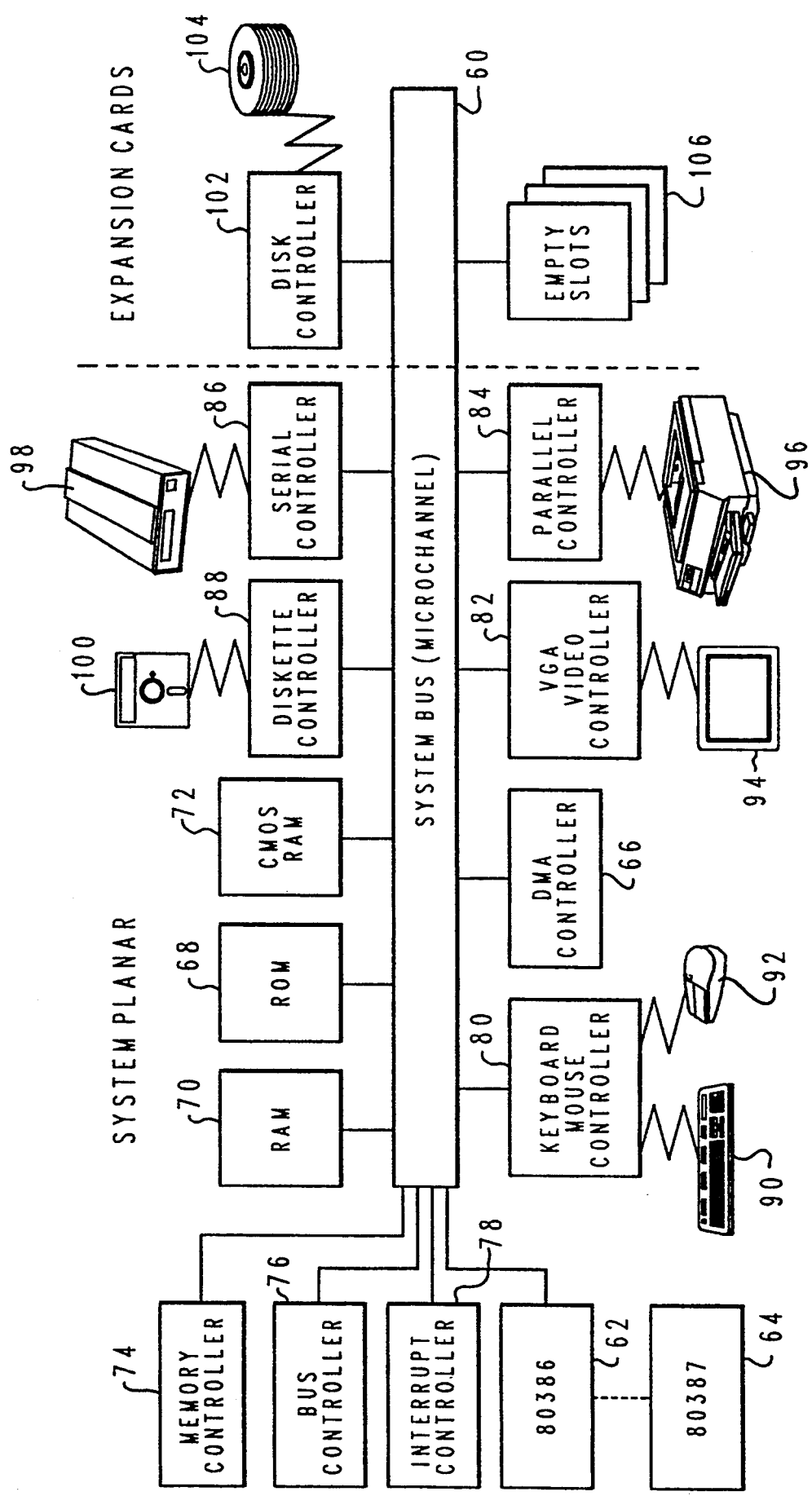
FIG. 2 depicts a block diagram of selected components in personal computer illustrated in FIG. 2 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input-/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted. For example, various adapters designed for use with multimedia presentations, such as a high resolution graphics adapter, may be added to empty slots 106.

Figure 3:
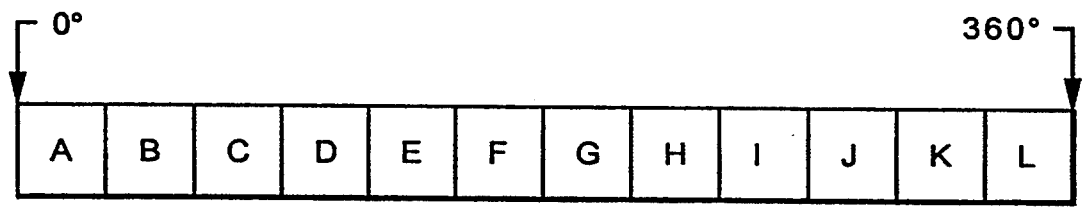
FIG. 3 depicts a pictorial representation of a wide-angle image that may be manipulated utilizing the method and system of the present invention.

Referring now to FIG. 3, a pictorial representation of a wide-angle or panoramic image that may be manipulated utilizing a circular control icon in accordance with a method and system of the present invention. Image 300 is depicted as a 360 degree panoramic image. At a given resolution only a portion of image 300 may be viewed on a video display device in a data processing system. Those portions of image 300 which are displayable on a video display device will depend upon the size of the display or the size of the window in which image 300 is being displayed for a given resolution. Image 300 may be subdivided into equal twelve sections or segments A, B, C, D, E, F, G, H, I, J, K, and L. These subdivisions are arbitrary and are depicted and described only for purposes of illustrating a preferred embodiment of the present invention. In fact, in many situations, no subdivisions are present. In these situations, the segments are arbitrary divisions utilized only for purposes of placing reference points within an image and are not necessarily actual boundaries.

Although section A is not depicted adjacent to section L, these two sections are adjacent in image 300. Section A begins at 0 degrees and section L ends at 360 degrees. Each section thus represents a 30 degree portion or section of an entire 360 degree image.

A rotatable scroll bar, including a slider, is provided in accordance with a preferred embodiment of the present invention. This rotatable scroll bar includes a generally centrally located pivot point, allowing the user to select or "grab" the head or tail of the scroll bar and rotate it in a clockwise or counterclockwise direction utilizing a graphical pointing device such as mouse 58 (see FIG. 1). The direction of the "head" or "tail" of the scroll bar, depending on which one is selected, would indicate which portion of a wide-angle image is currently being displayed within a display device.

Figure 4A:
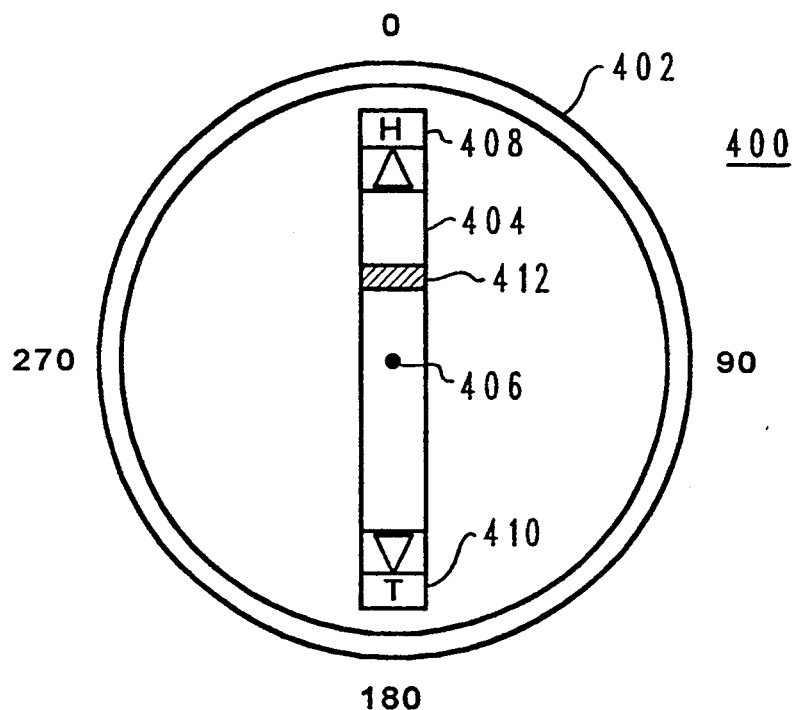
FIG. 4A is a pictorial representation of a rotatable scroll bar in accordance with a preferred embodiment of the present invention.
Figure 4B:
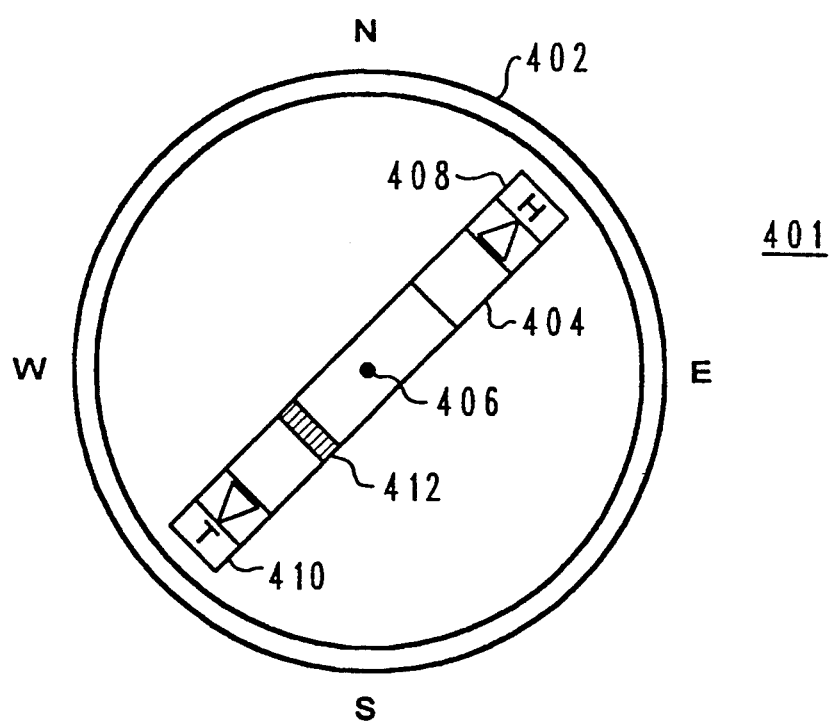
FIG. 4B is an alternative embodiment of the rotatable scroll bar depicted in FIG. 4A.

Referring now to FIGS. 4A and 4B, pictorial representations of a rotatable scroll bar provided in accordance with a preferred embodiment of the present invention are depicted. As depicted in FIG. 4A, the present invention provides a circular control icon 400 having a peripheral section 402. Although peripheral section 402 is a circle in the depicted embodiment, it is contemplated that any substantially circular shape may be employed within a preferred embodiment of the present invention. "Substantially circular shape", as utilized herein, shall mean any regular polygonal shape such as, for example, a hexagon or an octagon. Points along peripheral section 402 may correspond or map to one or more sections of image 300 as depicted in FIG. 3.

Scroll bar 404 is located within peripheral section 402 and is rotatable about pivot point 406. Scroll bar 404 preferably includes head 408 and tail 410. Slider 412 is illustrated as being located between head 408 and tail 410. Either head 408 or tail 410 may be selected by a user utilizing a mouse, or other graphic pointing device, to rotate scroll bar 404 about pivot point 406, in accordance with a preferred embodiment of the present invention. Although pivot point 406 in the depicted embodiment is centrally located, other pivot point locations may be utilized in accordance with a preferred embodiment of the present invention.

Head 408 may be selected by the user and rotated to point to or select a point along peripheral section 402. As a result, a portion of an image corresponding or mapping to the point selected along peripheral section 402 is then displayed within the display device, in accordance with a preferred embodiment of the present invention.

Slider 412 provides an additional means for manipulating image 300. For example, slider 412 may control a "zoom" function. A user may move slider 412 along scroll bar 402 to "zoom" in or out of image 300. In "zooming" in or out of an image, a closer or more distant view of the image may be presented to a user utilizing a display device. In presenting a closer view of a portion of the image, a lesser amount of the total image may be displayed within the display device at one time. Conversely, in selecting a more distant view from a point or object in the image, more of the image may be displayed within the display device. As a result the image is redrawn utilizing various resolutions to perform a so-called "zoom" function.

The "zoom" function also may be implemented by changing the resolution of image 300. Alternatively, the "zoom" function may be implemented by utilizing associated alternate images having a desired viewing distance selected by slider 412. Thus, if slider 412 was manipulated to "zoom" in on a particular view or point within image 300, the resolution could be changed or an alternate image may be displayed to provide the desired view, in accordance with a preferred embodiment of the present invention. Those skilled in the art will realize that various other functions may be implemented utilizing slider 412 in accordance with a preferred embodiment of the present invention.

If manipulation of the scroll bar results in the scroll bar being at an angle (see FIG. 4B), the entire circular control icon may be redrawn with the scroll bar in a vertical orientation, and the peripheral section may be rotated to match the vertical orientation of the scroll bar in accordance with a preferred embodiment of the present invention.

In the depicted embodiment in FIG. 4A, peripheral section 402 is labeled in degrees. Other labels, such as "north", "south", "east", and "west" also may be utilized in accordance with a preferred embodiment of the present invention, as illustrated by circular control icon 401 in FIG. 4B, which depicts an alternate embodiment of the rotatable scroll bar utilizing directions for labels, instead of degrees.

Figure 5A:
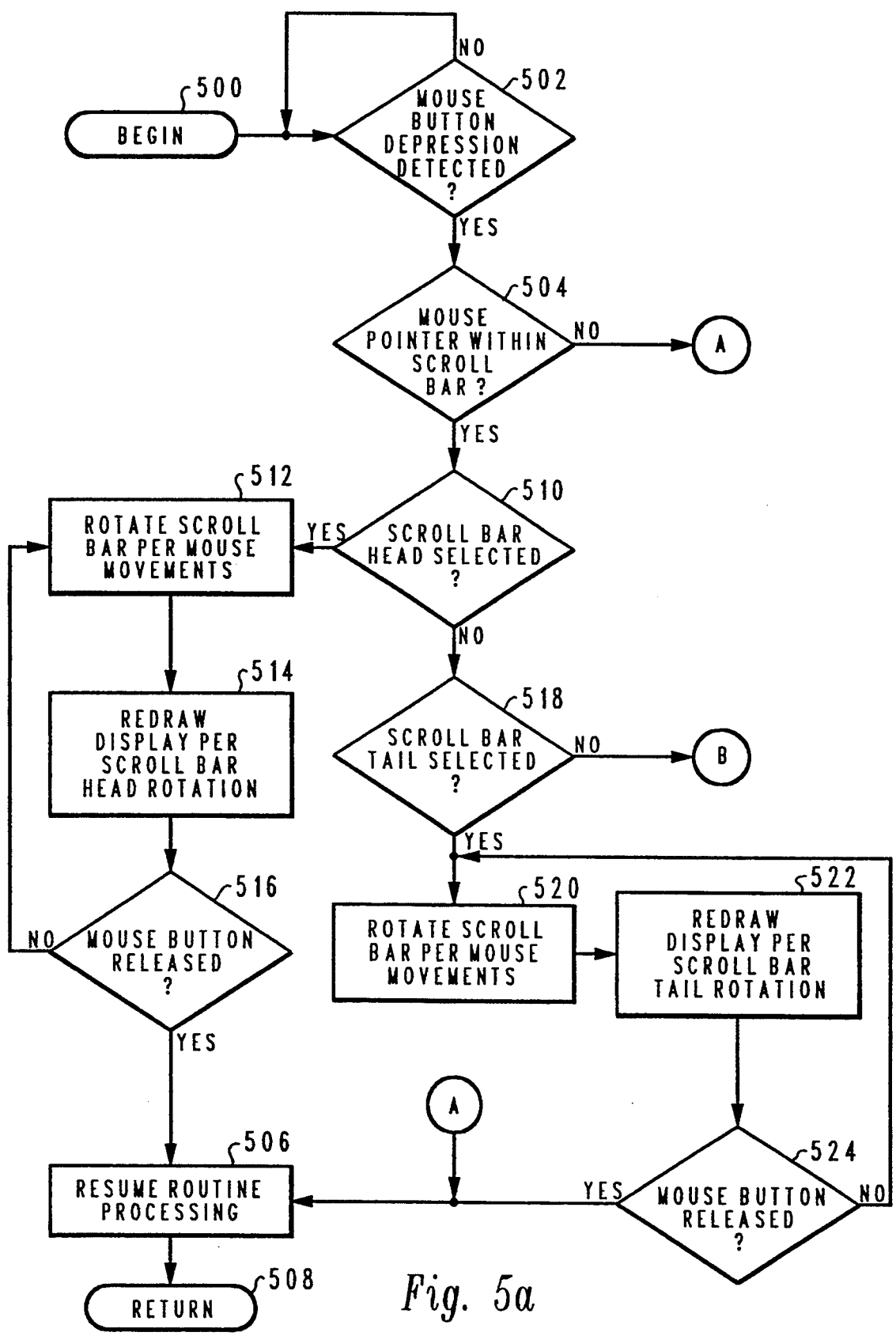
FIG. 5A depicts a portion of a high level logic flowchart illustrating a method and system for manipulating a wide-angle image in accordance with a preferred embodiment of the present invention.
Figure 5B:
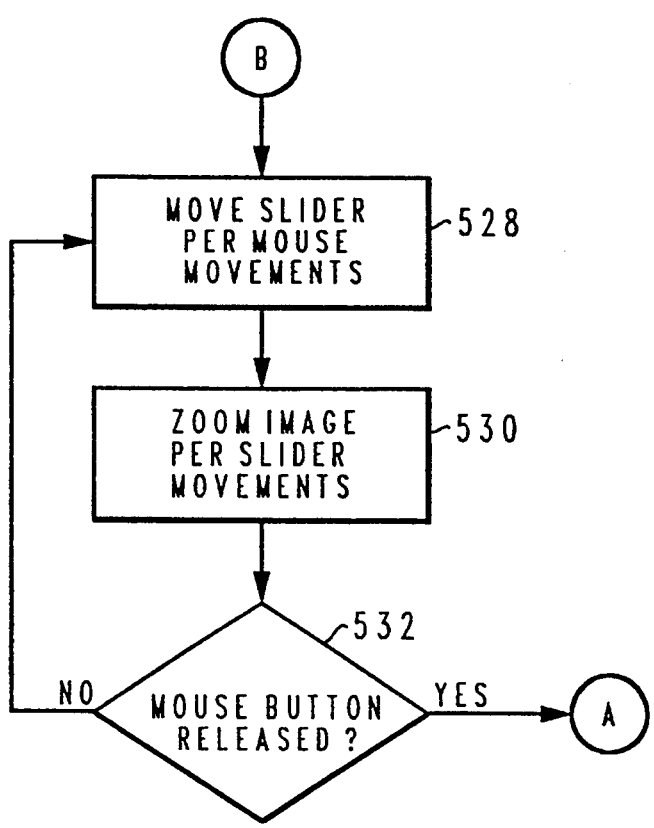
FIG. 5B depicts a portion of a high level logic flowchart illustrating a method and system for manipulating a wide-angle image in accordance with a preferred embodiment of the present invention.

With reference now to FIG. 5, a high level logic flowchart illustrating a method and system for manipulating a wide-angle image in accordance with a preferred embodiment of the present invention is depicted. As depicted, the process begins in block 500 and thereafter proceeds to block 502, which illustrates a determination of whether or not a mouse button depression has been detected. After detecting the depression of a mouse button in block 502, the process proceeds to block 504, which depicts a determination of whether or not the mouse pointer is within the rotatable scroll bar. If the mouse pointer is not within the rotatable scroll bar, the process proceeds to block 506, via connector A. Block 506 illustrates the resuming of routine processing with the process thereafter terminating as illustrated in block 508.

Referring again to block 504, if the mouse pointer is within the rotatable scroll bar, the process to block 510. Block 510 illustrates a determination of whether or not the scroll bar head has been selected. Selection of the scroll bar head results in the process advancing to block 512 and thereafter performing a standard "drag and drop" operation.

The aforementioned "drag and drop" operation begins, as illustrated in block 512, by rotating the scroll bar in response to the movements of the mouse in a manner well known to those having knowledge of graphical pointing devices. Next, the process advances to block 514, which illustrates the redrawing of the display to display alternate portions of the image, as selected by the rotation of the scroll bar.

Next, the process passes to block 516, which depicts a determination of whether or not the mouse button has been released, and if not, the process returns iteratively to block 512 to continue to rotate the scroll bar and redraw the image. In the event that the mouse button has been released, the process advances to block 506, which illustrates the resuming of routine processing. Thereafter, the process terminates, as depicted in block 508.

Referring again to block 510, if the scroll bar head has not been selected, the process then advances to block 518. Block 518 depicts a determination of whether or not the scroll bar tail has been selected. Selection of the scroll bar tail results in the process proceeding to block 520, which once again illustrates the rotation of the scroll bar, in response to the movements of the mouse. The process then passes to block 522. Block 522 depicts redrawing of the display on the display device to display the alternate portions of the image, as selected by the scroll bar tail.

Next, the process proceeds to block 524. Block 524 illustrates a determination of whether or not the mouse button has been released and if not, the process iteratively returns to block 520. In the event that the mouse button has been released, the process passes to block 506, which illustrates the resuming of routine processing. Thereafter, the process terminates, as depicted in block 508.

Referring again to block 518, if the scroll bar tail has not been selected, in accordance with a preferred embodiment of the present invention, the remaining selections involve movement of the slider within the scroll bar. The process then advances to block 528. Block 528 depicts the movement of the slider along the scroll bar in response to the movement of the mouse. The process then passes to block 530. Block 530 depicts the "zooming" of the image in accordance with the movements of the slider, as described above.

Next the process passes to block 532, which depicts a determination of whether or not the mouse button has been released. The process will return to block 520 iteratively until the mouse button is released, continuing to "zoom" in or out on the image per movement of the slider. Upon release of the mouse button, the process then advances to block 506, via connector A. Block 506 illustrates the resuming of routine processing with the process then terminating, as depicted in block 508. One skilled in the art will realize that a multitude of different functions other than a "zoom" function may be associated with the slider.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system having a display device for efficiently managing the display of an image which includes a plurality of segments, wherein only a portion of said plurality of segments may be simultaneously displayed within said display device at a selected resolution, said method comprising the data processing system implemented steps of:

displaying a substantially circular control icon having a defined periphery;

associating one or more of said plurality of segments within said image with selected points along said defined periphery;

displaying a rotatable pointer element rotatable about a point within said substantially circular control icon;

displaying at least a portion of said plurality of segments within said display device; and altering said portion of said plurality of segments displayed within said display device in response to a rotation of said rotatable pointer element, wherein display of said image is efficiently managed, wherein said step of displaying a rotatable pointer element rotatable about a point within said substantially circular control icon comprises displaying a rotatable scroll bar as said rotatable pointer element.

2. The method of claim 1, wherein said step of displaying a rotatable scroll bar in association with a display of said portion of said plurality of segments includes the step of providing a moveable slider within said rotatable scroll bar.

3. The method of claim 2 further comprising altering a resolution of said display of a portion of said plurality of segments displayed within said display device in response to a movement of said moveable slider.

4. A data processing system having a display device for efficiently managing the display of an image which includes a plurality of segments, wherein only a portion of said plurality of segments may be simultaneously displayed within said display device at a selected resolution, said data processing system comprising display means for displaying a substantially circular control icon having a defined periphery;

association means for associating one or more of said plurality of segments within said image with selected points along said defined periphery;

display means for displaying a rotatable pointer element rotatable about a point within said substantially circular control icon;

display means for displaying at least a portion of said plurality of segments within said display device; and altering means for altering said portion of said plurality of segments displayed within said display device in response to a rotation of said rotatable pointer element, wherein display means for displaying a rotatable pointer element rotatable about a point within said substantially circular control icon comprises means for displaying a rotatable scroll bar as said rotatable pointer element.

5. The data processing system of claim 4, wherein said display means for displaying a rotatable scroll bar in association with a display of said portion of said plurality of segments includes means for providing a moveable slider within said rotatable scroll bar.

6. The data processing system of claim 5 further comprising means for altering said display of a portion of said plurality of segments displayed within said display device in response to a movement of said moveable slider.

7. The data processing system of claim 6, wherein said means for altering said display of a portion of said plurality of segments displayed within said display device in response to a movement of said slider includes means for altering said resolution of said display.

8. The data processing system of claim 7, wherein selected points of said defined periphery map to one of said plurality of segments of said image.

9. The data processing system of claim 8, wherein said substantially circular control icon is a circle.

10. The data processing system of claim 8, wherein said substantially circular control icon is an octagon.

11. The data processing system of claim 4, wherein said rotatable scroll bar has a first selectable end for selecting points along said defined periphery and wherein said altering means includes means for altering said portion of said plurality of segments displayed in response to a selection of selected points along said defined periphery by said first selectable end.

12. The data processing system of claim 11, wherein said scroll bar includes a second selectable end for selecting selected points along said defined periphery and wherein said altering means includes means for altering said portion of said plurality of segments displayed in response to a selection of selected points along said defined periphery by said second selectable end.

* * * * *